(12) United States Patent
Edwiges et al.

(10) Patent No.: US 11,535,383 B2
(45) Date of Patent: Dec. 27, 2022

(54) DEFROSTING A DRAIN HOLE

(71) Applicant: SAFRAN AIRCRAFT ENGINES, Paris (FR)

(72) Inventors: Brice Cyril Edwiges, Moissy-Cramayel (FR); Philippe Robert Jean Goffinon, Moissy-Cramayel (FR); Arnaud Baudran, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 356 days.

(21) Appl. No.: 16/850,399

(22) Filed: Apr. 16, 2020

(65) Prior Publication Data

US 2020/0331614 A1   Oct. 22, 2020

(30) Foreign Application Priority Data

Apr. 16, 2019   (FR) ....................... 1904078

(51) Int. Cl.
*F01D 25/32* (2006.01)
*B64D 13/06* (2006.01)

(52) U.S. Cl.
CPC ............. *B64D 13/06* (2013.01); *F01D 25/32* (2013.01)

(58) Field of Classification Search
CPC .................. F01D 25/32; B64D 13/06
See application file for complete search history.

(56) References Cited

U.S. PATENT DOCUMENTS

| 4,424,989 | A | 1/1984 | Spencer et al. | |
| 7,591,869 | B2* | 9/2009 | Jensen | B64D 13/00 55/434.2 |
| 2016/0223419 | A1 | 8/2016 | Kirby | |
| 2016/0333724 | A1* | 11/2016 | Dib | F15D 1/0015 |
| 2017/0205111 | A1* | 7/2017 | Simpson | B01D 45/12 |

FOREIGN PATENT DOCUMENTS

| EP | 1 193 378 A2 | 4/2002 |
| EP | 3 096 120 A1 | 11/2016 |
| EP | 3 192 740 A1 | 7/2017 |
| GB | 2 538 383 A | 11/2016 |

OTHER PUBLICATIONS

French Application No. 1904078; Search Report dated Dec. 6, 2019—8 pgs. (In French; relevance found in the citations therein).

* cited by examiner

*Primary Examiner* — Michael L Sehn
(74) *Attorney, Agent, or Firm* — Lathrop GPM LLP

(57) ABSTRACT

The invention relates to an assembly (10) for a turbomachine comprising a pipe (12) connected at one end (12*a*) to means (14) for supplying pressurized air and at one opposite end (12*b*) to an item of equipment (16) of the turbomachine, the pipe (12) having a bent portion (12*c*) intended for forming in use a low point of the pipe (12), said bent portion (12*c*) having a hole (18) for first draining water from the pipe (12), wherein it further comprises an orifice (20) arranged downstream of the drain hole (18).

15 Claims, 1 Drawing Sheet

DEFROSTING A DRAIN HOLE

CROSS-REFERENCE TO RELATED APPLICATION

This application claims priority to French Patent Application No. 1904078, filed Apr. 16, 2019, which is incorporated herein by reference.

TECHNICAL FIELD OF THE INVENTION

The invention relates to the field of turbomachines and more particularly that of devices or systems comprising means for supplying pressurized air.

PRIOR ART

Conventionally, pressurized air ducts, coming from the compressor, are used to supply pressure to certain items of equipment comprising control or measuring devices, the operational integrity of at least some of which may prove essential to the operation of the turbomachine. For example, the loss of pressure in the pressurized air supply duct can cause the engine to stop in-flight and potentially not be able to restart.

The extracted air is charged with moisture, which can condense when in contact with the duct that circulates in colder places than the extraction zone, for example the compressor of the turbomachine. Due to the design of the turbomachine, some ducts have at least one bent portion defining a low point. It is therefore understandable that under cold conditions, water that has condensed can freeze and possibly clog the pipe. As a result, the low point of the pipe includes a drain hole, about 1 mm in diameter, for draining water. This hole is positioned in such a way as to allow water to be evacuated by the action of the earth's gravity.

However, the small size of the drain hole makes it almost inevitable that a very small volume of water will be retained at the drain hole itself, mainly due to the surface tension of the water. Thus, under cold conditions, for example when storing the aircraft outside in winter, the drain hole can be clogged and the water leakage it used to allow is no longer possible. When the flow of hot air through the duct is low, the clogged condition of the drain hole may be maintained in-flight until weather conditions permit the drain hole to be de-iced. The condensation water draining function is then no longer provided. The function provided by the item of equipment can therefore no longer be perfectly ensured since the hot air flow in the duct is not identical to what was planned when designing the turbomachine.

SUMMARY OF THE INVENTION

The invention thus provides an assembly for a turbomachine comprising a pipe connected at one end to pressurized air supply means and at one opposite end to an item of equipment of the turbomachine, the pipe having a bent portion being intended to form in use a low point of the pipe, said bent portion having a drain hole for draining water from the pipe, wherein it further comprises an orifice arranged downstream of the drain hole. Upstream and downstream are defined by the direction of flow of the hot air stream in the pipe.

The outlet orifice is arranged upstream of the item.

Forming an orifice, as proposed here, allows for the circulation of hot air with a predetermined minimum flow rate, which will ensure that, in operation, a plate of ice that would have formed at the purge hole will thaw. Indeed, when pressurizing a turbomachine comprising such an assembly, the circulating hot air will ensure a leakage flow through the orifice which will defrost a frost plug. In addition, the air circulation created by the orifice facilitates the evacuation of water at the low point and improves the evacuation of condensation water.

Another feature is that the drain hole opens outside the pipe downward and has a substantially vertically oriented axis.

This orifice can opens outside the pipe upwards. The term "up" indicates above a horizontal plane and the term "down" indicates in the lower half of said horizontal plane.

The drain hole and the orifice may have axes arranged in the same plane. The axis of the drain hole can be oriented substantially vertically. The axis of the air outlet orifice can be oriented between −90° and +90°. The air outlet hole is on the upper part of the pipe to avoid getting wet and therefore limited to −85° and +85° from the vertical, with 0° pointing upwards] from a plane containing the vertical direction.

The drain hole can have a diameter ranging from 0.5 mm to 3 mm.

The air flow orifice can have a diameter ranging from 0.1 mm to 3 mm.

This document also relates to a turbomachine comprising an assembly as described above.

DETAILED DESCRIPTION OF THE INVENTION

Figure 1:
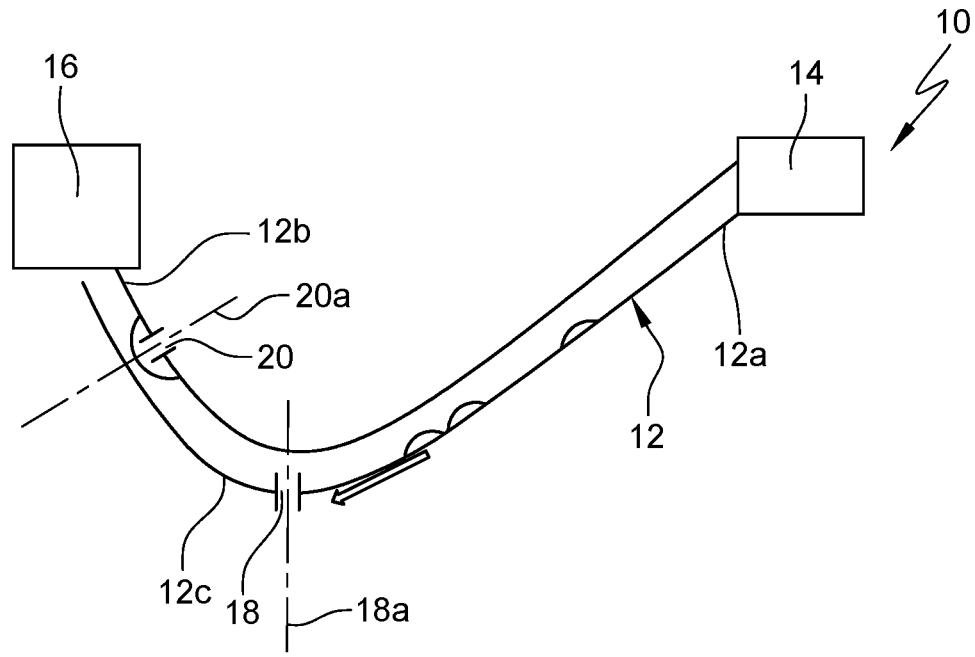
FIG. 1 represents an assembly according to this document, with the turbomachine being switched off
Figure 2:
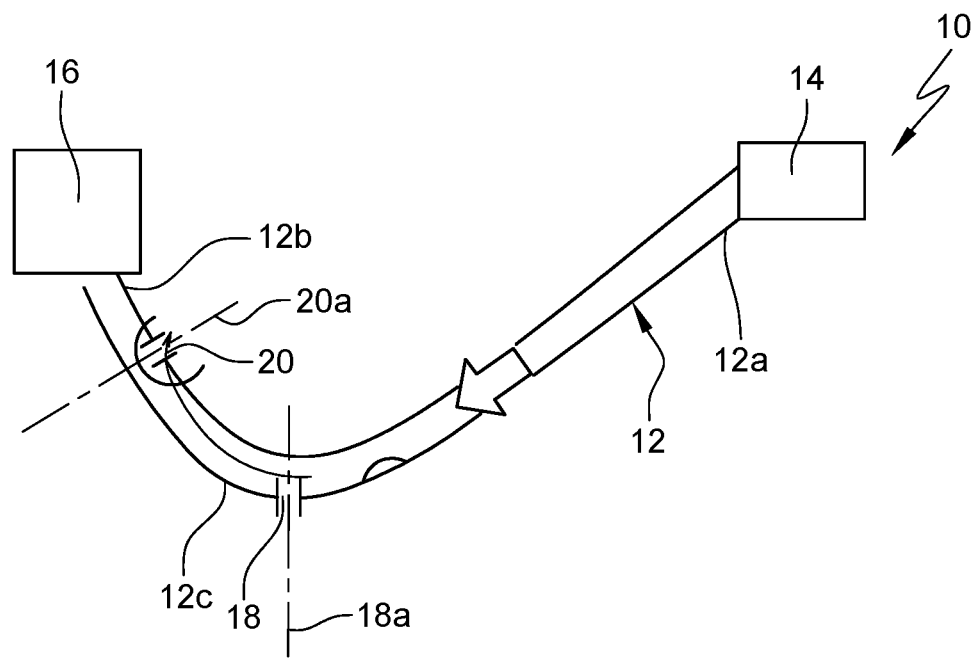
FIG. 2 represents an assembly according to this document, with the turbomachine operating

Reference is now made to FIGS. 1 and 2 which represent an assembly 10 according to the invention comprising a pipe 12 comprising an upstream end 12a connected to pressurized air supply means 14, such as for example a compressor of a turbomachine, and a downstream end 12b connected to an item of equipment 16 requiring a supply of pressurized hot air. As can be seen, the pipe 12 includes a bent portion 12c, as shown in the figures, forming a low point, i.e. a point lower than the rest of the pipe 12. Thus, it is understood that the upstream end 12a and downstream end 12b of the pipe 12 are arranged above the bent portion 12c.

The pipe 12, shown in the figures, consists of a single bent portion 12c. However, it could include several thereof.

The bent portion 12c includes a drain hole 18 having an axis 18a substantially vertical and substantially normal to the duct wall. The orifice 18 opens downwards. The pipe 12 also includes a hot air outlet orifice 20, which is located downstream of the drain hole 18 and upstream of the item of equipment 16. The axis 20a of air flow orifice 20 may be oriented between −85° and +85° relative to a plane containing the vertical direction and substantially normal to the pipe wall, with zero degrees pointing upwards. The axis 18a of the drain hole 18 and the axis 20a of the hot air outlet orifice 20 can be coplanar.

When the turbomachine is switched off, the water that has condensed flows to the drain hole 18 and normally flows therethrough. However, under cold conditions, water may freeze at the drain hole 18 and block the water discharge (FIG. 1). The addition of a hot air circulation orifice 20 maintains hot air circulation to defrost the pipe water, particularly frozen water at the drain hole. As a result, the drain hole can no longer be clogged and nominal operation of the pipe 12 is guaranteed, which can then perform its function of supplying hot air to the item of equipment.

If the pipe 12 consists of several successive bent portions, at least some of which form low points, then it is understood that the hot air outlet should be formed between the item of equipment and the most downstream low point. Only one orifice can be used in such a configuration. However, it is possible to have more than one air outlet, for example, one can be provided for each low point.

The invention claimed is:

1. An assembly for a turbomachine comprising a pipe connected at an upstream end to means for supplying pressurized hot air and at an opposite downstream end to an item of equipment of the turbomachine, the pipe comprising:
    a V-shaped bent portion for forming a low point lower than the upstream end and the downstream end of the pipe such that a drain portion of the pipe is inclined upwards downstream of the V-shaped bent portion;
    a drain hole in the V-shaped bent portion for draining water from the pipe;
    an outlet orifice for hot air arranged downstream of the drain hole and arranged upstream of the item of equipment, said outlet orifice opening to the outside of the pipe, wherein said outlet orifice opens upwards along an inclined direction, so that hot air flows upwards through both said drain portion of the pipe and the outlet orifice.

2. The assembly according to claim 1, wherein the drain hole opens outside the pipe downwardly and has a substantially vertically oriented axis.

3. The assembly according to claim 2, wherein the drain hole and the outlet orifice have axes arranged in the same plane.

4. The assembly according to claim 2, wherein the drain hole has a diameter ranging from 0.5 mm to 3 mm.

5. The assembly according to claim 2, wherein the outlet orifice has a diameter ranging from 0.1 mm to 3 mm.

6. A turbomachine, wherein the turbomachine comprises the assembly according to claim 2.

7. The assembly according to claim 1, wherein the drain hole and the outlet orifice have axes arranged in the same plane.

8. The assembly according to claim 7, wherein the drain hole has a diameter ranging from 0.5 mm to 3 mm.

9. The assembly according to claim 7, wherein the outlet orifice has a diameter ranging from 0.1 mm to 3 mm.

10. A turbomachine, wherein the turbomachine comprises the assembly according to claim 7.

11. The assembly according to claim 1, wherein the drain hole has a diameter ranging from 0.5 mm to 3 mm.

12. The assembly according to claim 11, wherein the outlet orifice has a diameter ranging from 0.1 mm to 3 mm.

13. The assembly according to claim 1, wherein the outlet orifice has a diameter ranging from 0.1 mm to 3 mm.

14. A turbomachine, wherein the turbomachine comprises the assembly according to claim 1.

15. An assembly for a turbomachine comprising a pipe connected at one end to means for supplying pressurized hot air and at one opposite end to an item of equipment of the turbomachine, the pipe comprising:
    a V-shaped bent portion forming a low point lower than the upstream end and the downstream end of the pipe such that a drain portion of the pipe is inclined upwards downstream of the V-shaped bent portion;
    a drain hole in the V-shaped bent portion for draining water from the pipe;
    an outlet orifice for hot air arranged downstream of the drain hole and arranged upstream of the item of equipment, said outlet orifice opening to the outside of the pipe, wherein said outlet orifice opens upwards along an inclined axis, and the pipe is globally V-shaped, so that the pipe has:
        a first portion upstream of the drain hole and inclined towards said V-shaped bent portion, and,
        a second portion downstream of the drain hole and inclined towards said V-shaped bent portion, so that hot air can flow upwards along both the second portion and the outlet orifice for being inclined in the same direction as the inclined axis.

* * * * *